United States Patent
Smolski (10) Patent No.: US 6,523,111 B1
(45) Date of Patent: Feb. 18, 2003

(54) REMOTE CONFIGURATION/SETUP OF COMPUTER SYSTEMS OPERATED AS EMBEDDED CONTROLLERS WITHOUT KEYBOARD OR VIDEO DISPLAY RESOURCES

(75) Inventor: Steven Joseph Smolski, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1080 days.

(21) Appl. No.: 08/711,180

(22) Filed: Sep. 9, 1996

(51) Int. Cl.[7] .......................... G06F 15/177; G06F 1/24
(52) U.S. Cl. ............................ 713/2; 713/1; 713/100
(58) Field of Search ........................ 395/651, 652, 395/653, 200.58, 200.59

(56) References Cited

U.S. PATENT DOCUMENTS

| | | | |
|---|---|---|---|
| 4,926,481 A | * 5/1990 | Collins, Jr. ................. 380/25 |
| 5,014,193 A | 5/1991 | Garner et al. |
| 5,138,706 A | 8/1992 | Melo et al. |
| 5,247,682 A | 9/1993 | Kondou et al. |
| 5,452,454 A | * 9/1995 | Basu ......................... 395/700 |
| 5,471,576 A | * 11/1995 | Yee ........................... 395/154 |
| 5,471,634 A | * 11/1995 | Giorgio et al. ............. 395/600 |
| 5,535,415 A | 7/1996 | Kondou et al. |
| 5,537,627 A | 7/1996 | Dahlberg |
| 5,795,228 A | * 8/1998 | Trumbull et al. ............. 463/42 |

FOREIGN PATENT DOCUMENTS

| JP | 136220 | 5/1989 |
|---|---|---|
| WO | 95/22105 | 8/1995 |

OTHER PUBLICATIONS

IBM Technical Disclosure Bulletin, vol. 37, No. 07, Jul. 1994, "Post Support for Manufacturing Medialess Machines", pp. 617–620.

* cited by examiner

Primary Examiner—Peter Wong
Assistant Examiner—Tim Vo
(74) Attorney, Agent, or Firm—Casimer K. Salys (57) ABSTRACT

Method and program product operable on a computer for changing configuration/setup parameters in an embedded controller type X86 based computer system, the system characterized by the absence of any keyboard or video display, from a remote terminal. The power on self test sequence is modified to produce an externally detectable audio-visual signal indicating potential access through a port as an aspect of communicating configuration/setup from the remote terminal. Communication is established through the port of the embedded controller using a refined interrupt which selectively accepts keyboard data entered at a remote terminal and translates that data into configuration/setup parameters for the embedded controller. Similarly, configuration/setup menu and the like information generated in the embedded controller is intercepted by a refined interrupt, filtered in graphical content for alpha numeric characters, and restructured into data transmittable from the port of the embedded controller to the remote terminal. To change configuration/setup parameters, the operator connects the remote terminal cable to the embedded controller port, initiates a power on self test mode, detects an audio-visual response indicating a window of access to change the configuration/setup parameters, enters the appropriate control signals to initiate the change, and thereafter interacts with the remote terminal display and keyboard to change the configuration/setup parameters as if accomplished local to the embedded controller.

18 Claims, 10 Drawing Sheets

PSEUDO CODE FOR FILTER

IF NOT FOREGROUND PAGE
  EXIT

IF "BULLET" CHAR
  REPLACE WITH '+'

IF SOLID ARROW
  REPLACE WITH '>'

IF UP ARROW
  REPLACE WITH 'U'

IF DOWN ARROW
  REPLACE WITH 'D'

IF '←'
  REPLACE WITH 'L'

IF '→'
  REPLACE WITH 'R'

IF NOT ALPHANUMERIC (A...Z, 0...9)
  EXIT

IF HIGHLIGHTED
  USE ANSI REVERSE VIDEO

EXIT

FIG. 10

REMOTE CONFIGURATION/SETUP OF COMPUTER SYSTEMS OPERATED AS EMBEDDED CONTROLLERS WITHOUT KEYBOARD OR VIDEO DISPLAY RESOURCES

FIELD OF THE INVENTION

The present invention relates generally to the configuration of computer systems. More particularly, the invention is directed to the entry of configuration/setup parameters into an embedded controller type computer system not having a keyboard or a display.

BACKGROUND OF THE INVENTION

Computer systems based on the X86 set of microprocessors, the most common examples being those manufactured by Intel and AMD, store system variable and parameter information in low power consumption CMOS memory devices. If the presence of a battery to power the CMOS memory is undesirable, electrically programmable nonvolatile integrated circuit memories are available at nominally higher costs. The variables and parameters stored are normally unique to the computer system, and as such are conventionally entered into the computer system by the individual who first configures the system.

Entry of the configuration/setup variables and parameters (hereinafter generally referred to as parameters) is accomplished through interaction with the BIOS code of the computer system using the system keyboard in response to selections shown on the video display of the computer system. Typical examples of the parameters include the time, the date, the enablement state of the cache, the memory wait states, et cetera, and for most computer systems routinely includes more than 20 parameters.

The compact size, broad functionally, and low cost of X86 based computer motherboards has led to significant interest and usage of such boards as controllers within manufacturing machinery, office equipment, and home appliances. In such applications, the computer system, primarily the motherboard, is conventionally referred to as an embedded controller. Computer systems operating as embedded controllers routinely do not have keyboards or meaningful video display systems. Consequently, the entry, correction, or updating of configuration/setup parameters is either very limited or requires the connection of a special keyboard and display, the latter also requiring a video card for a conventional X86 motherboard. The inclusion of a keyboard and display merely to change configuration/setup parameters is not particularly desirable even for a single embedded controller, more so when multiple embedded controllers are being purchased and operated. Clearly, it is undesirable to connect a keyboard, video display card and display to the motherboard of each embedded controller merely to replace, update, or otherwise change configuration/setup parameters.

There exists a need for an efficient method and related computer program product code which will allow by simple connection comprehensive bidirectional communication with a computer system so that a remote terminal can be used to change configuration/setup parameters of an X86 type computer system.

SUMMARY OF THE INVENTION

The remote configuration/setup of a computer system operated as an embedded controller without keyboard or video display resources is accomplished through the steps of initiating a power on test mode in the computer system, generating an audio-visual signal by the computer system, monitoring within the computer system for first control signals from a remote terminal, communicating configuration/setup data between the computer system and the remote terminal if first control signals are detected during the monitoring, completing the power on test mode if first control signals are not detected within a specified time, and returning the computer system to an initiation of the power on test mode responsive to second control signals generated within the remote terminal.

In another form, the invention relates to a program product storable on a tangible medium and operable to control a computer system to accomplish the aforementioned steps.

In a particularized practice of the invention, the X86 computer system BIOS code is modified so that the power on self test (POST) mode includes a sequence in which the embedded controller generates an audio signal notifying an operator that the embedded controller is receptive to remote entry of information. A remote terminal connected through a serial port to the embedded controller is then used to initiate remote communication, following the initial tramsmission of an appropriate access control signal from the remote terminal to the embedded controller over the serial line. Once communication is established, configuration/setup data is entered through the keyboard of the remote terminal and transmitted over the serial line to the embedded controller in response to video signals generated in the embedded controller and transmitted to the remote terminal. The communicated configuration/setup data is entered into the embedded controller as if generated locally. The bidirectional communication between the embedded controller and the remote terminal is established through the use of interrupts in the power on self test sequence, the interrupts routing video information to the serial port for transmission over the serial line to the remote terminal and returning configuration/setup data through the serial port as configuration/setup parameters.

These and other features of the invention will be more clearly understood and appreciated upon considering the detailed embodiment which follows hereinafter.

DESCRIPTION OF THE PREFERRED EMBODIMENT

Figure 1:
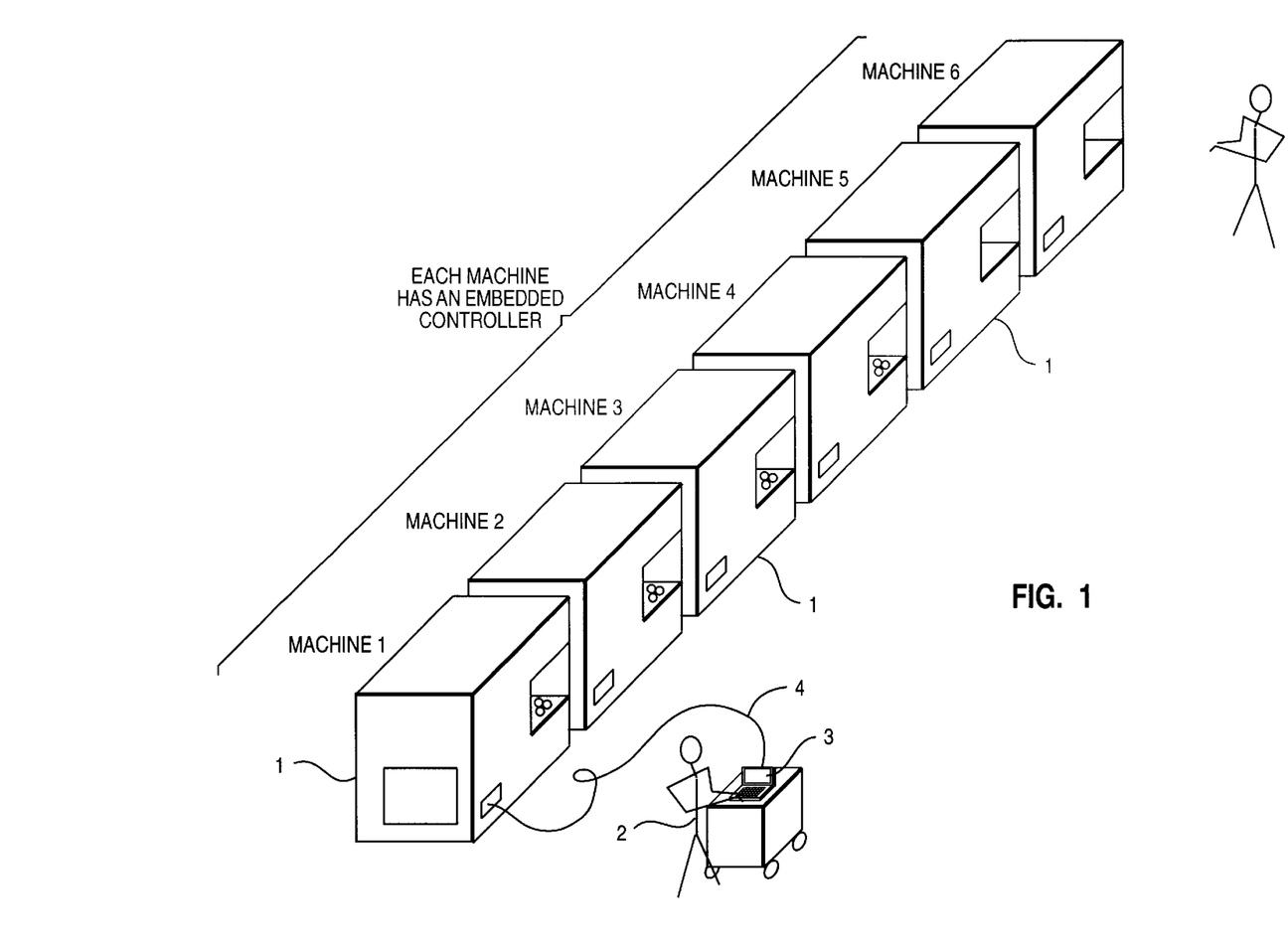
FIG. 1 is a schematic depicting multiple machines individually having an embedded controller.

FIG. 1 schematically depicts a practice of the invention in which machines 1, having individual embedded controllers, are subject to configuration/setup parameter changes introduced by operator 2 from remote terminal 3 over communication line 4. As described earlier, the embodying embedded controllers in each of machine 1 are X86 based computer systems which include basic input/output system (BIOS) code with power on self test (POST) operating modes and self booting operating systems such as PC DOS, OS/2 or Windows. Machines 1 are not limited in their function except to the extent that they do not have alpha numeric keyboards or comprehensive video display systems. As examples, the machines could be in an manufacturing line or advanced vending machines in a commercial setting. Remote terminal 3 depicted in FIG. 1 includes a keyboard and video display. Cable 4 can be a serial line, a parallel line, or even accomplished through infrared or radio frequency link. The underlying objective is to allow operator 2 to change configuration/setup parameters which characterize the individual X86 based embedded controller type computer systems which may or may not differ from machine to machine.

Figure 2:
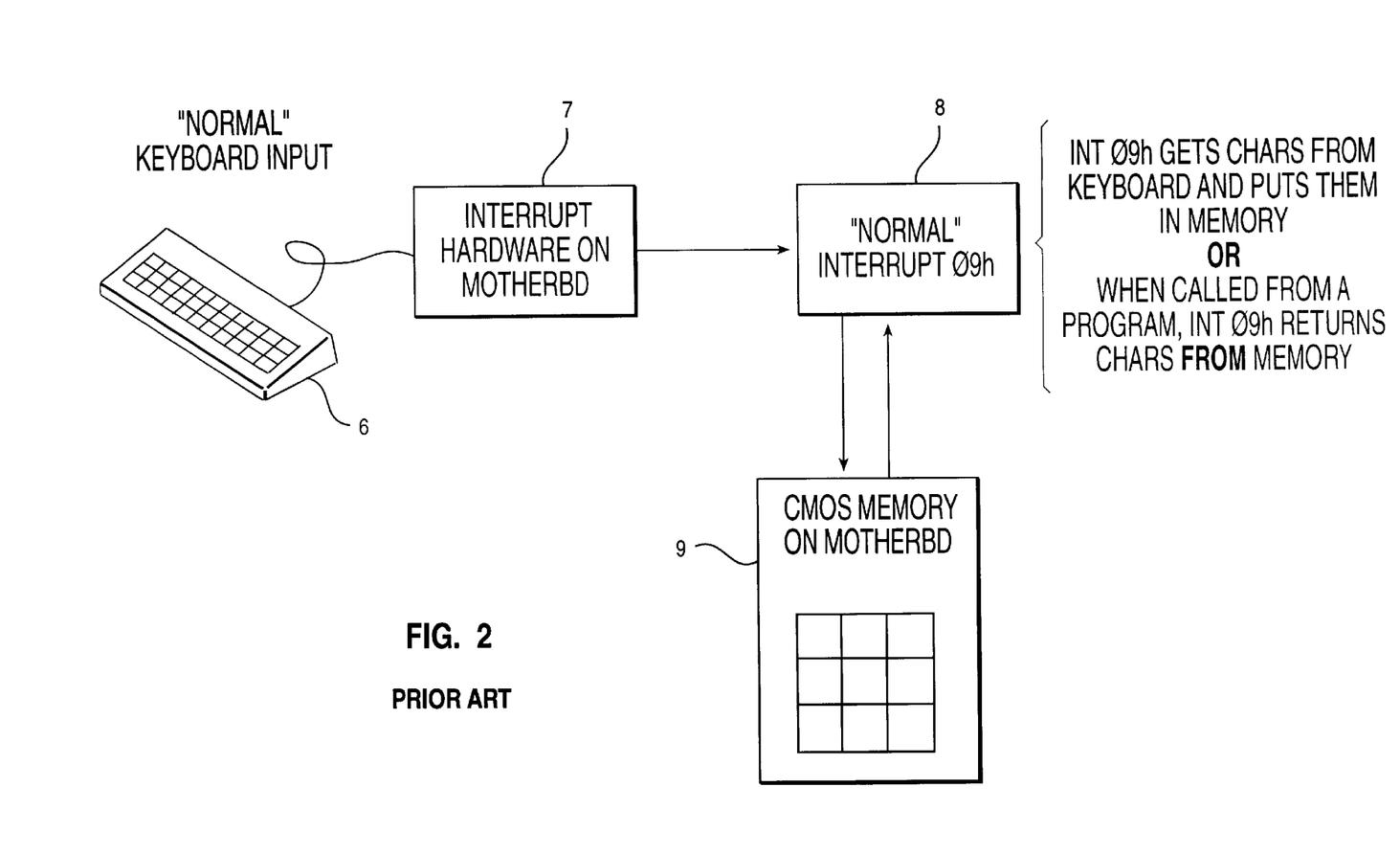
FIG. 2 is a schematic depicting normal configuration/setup communication between a keyboard and a computer system.

FIG. 2 schematically depicts how a normal keyboard interacts with an X86 type computer system to enter configuration/setup information. As shown, tactile action of keyboard 6 is identified in interrupt hardware on the motherboard 7, and in the "normal" mode initiates interrupt 09h (where the h stands for hexadecimal) to either send or return characters referenced to configuration/setup CMOS memory 9.

Figure 3:
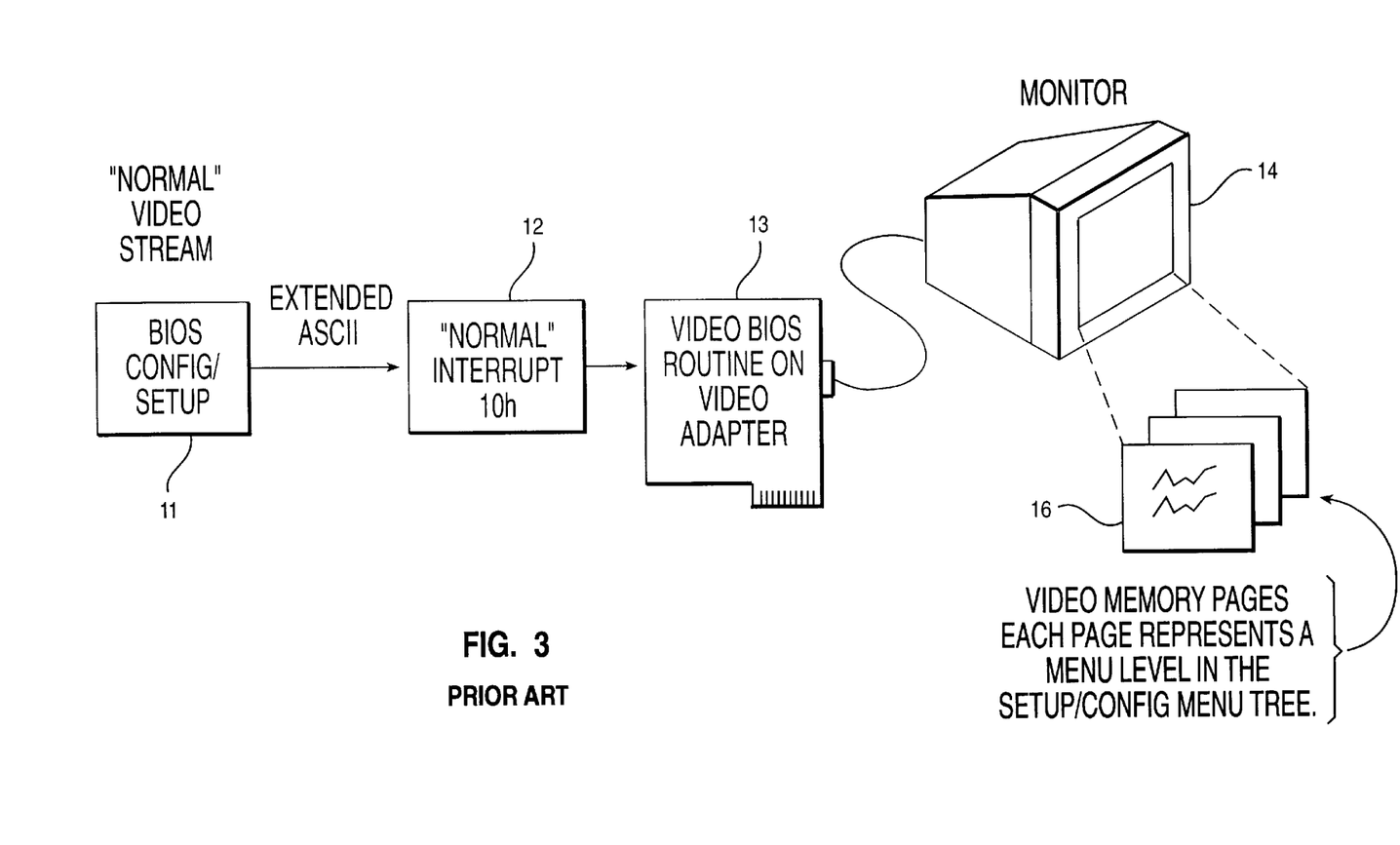
FIG. 3 is a schematic depicting normal configuration/setup communication between a computer system and video monitor (display).

The complementing activity during "normal" entry of configuration/setup parameter data in an X86 based computer system involves the generation of video display data suitable to depict the menu, and keyboard entered data, for visual realization. As shown in FIG. 3, the BIOS based configuration/setup data is provided in an extended ASCII format to "normal" interrupt 10h for transmission to the video BIOS routine on video adapter 13, and then in direct succession to video monitor 14 to illustrate the effects of the configuration/setup data entered on a succession of video pages 16. Note that the activities in FIGS. 2 and 3 require the presence of keyboard 6 and monitor 14 as an aspect of entering or changing configuration/setup parameters. In contrast, as noted earlier, the embedded controller type X86 computer system to which the invention relates lacks the normal keyboard, video adaptor and monitor.

Figure 4:
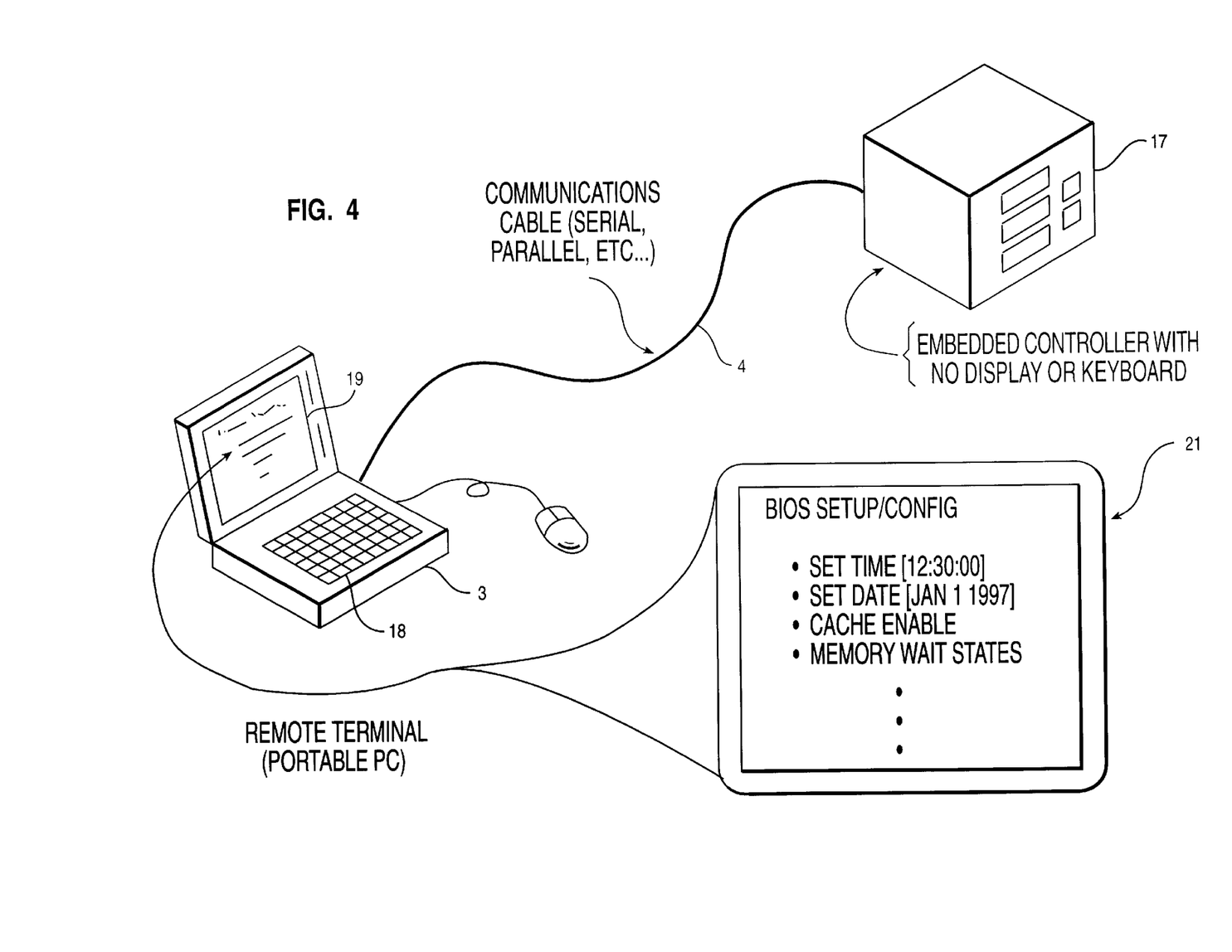
FIG. 4 is a schematic depicting the functional interaction between an embedded controller and a remote terminal in keeping with the practice of the present invention.

The absence of the normal resources needed to configure/set up an embedded controller based on the X86 architecture is rectified in the manner functionally depicted in FIG. 4 of the drawings. Embedded controller 17 has neither a keyboard nor a display. However, as shown, communication line 4, preferably but not necessarily serial format cable, is connected to a port of embedded controller 17 as well as a port of remote terminal 3, the remote terminal preferably being a portable X86 based personal computer. Remote terminal 3 has a keyboard 18 as well as a video display 19. An example screen from display 19 is shown at reference numerical 21. The invention contemplates that the configuration/setup parameters be viewed and tactilely entered using remote terminal 3 in response to video information communicated from embedded controller 17. The objective is to have the operator of remote terminal 3 communicate configuration/setup information to embedded controller 17 in an acceptable form and at a time when embedded controller 17 is receptive to configuration/setup parameter changes. A flow chart setting forth the operations accomplished in the context of FIG. 4 appears in FIG. 5.

Figure 5:
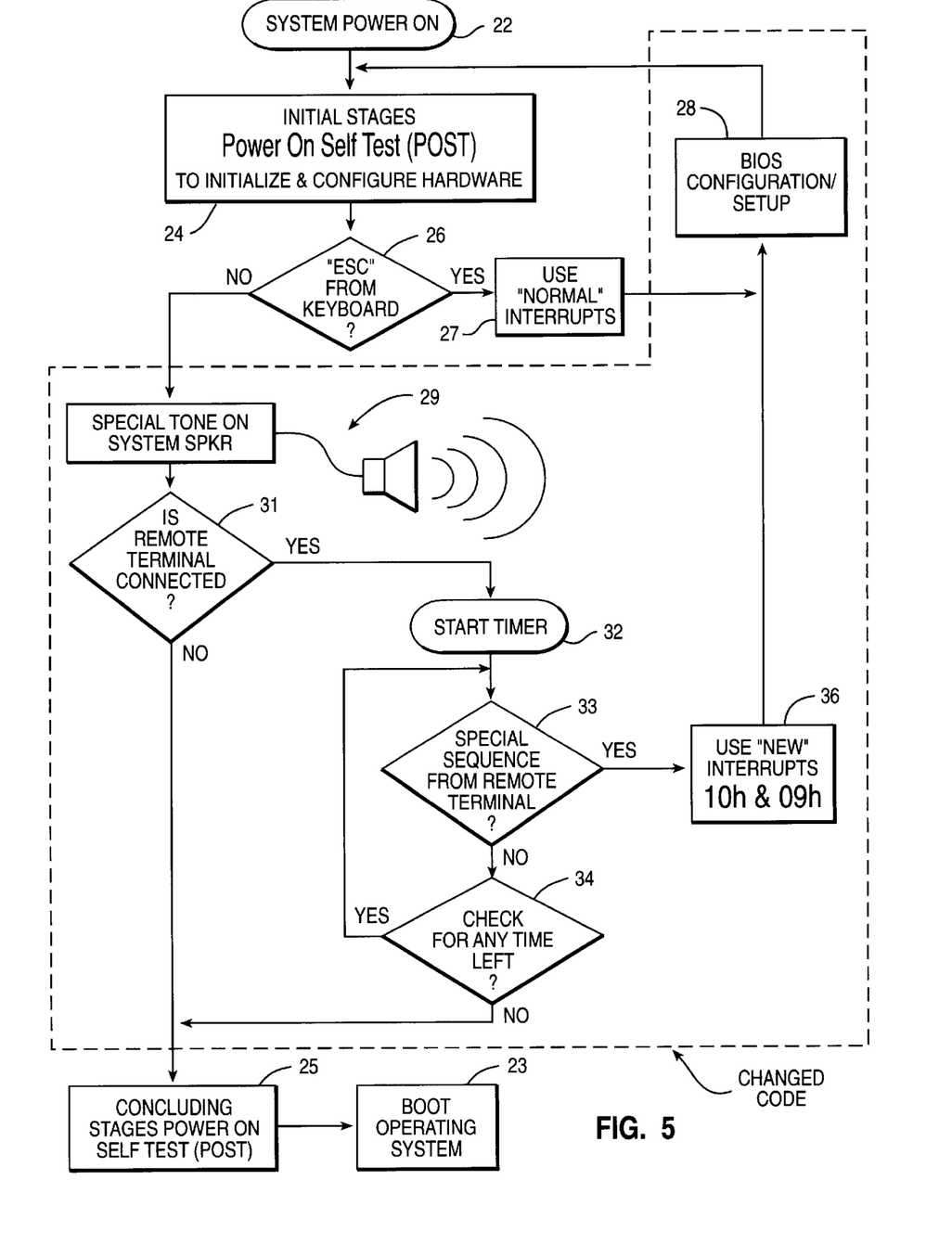
FIG. 5 is a schematic flow chart depicting operations associated with power on testing mode of a computer system, including changes to implement the present invention.

The embodiment of the invention depicted in FIG. 5 contemplates a refinement to the X86 based computer system BIOS code to allow the initiation of remote communication for configuration/setup parameter entry during power on self test (POST), a stage of machine operation before the boot of the operating system (PC DOS, OS/2, Windows, etc.). As embodied, the refined BIOS retains the normal capability to change configuration/setup parameters directly from a keyboard and video display local to the computer system while providing the further resource to initiate configuration/setup parameter changes from a remote terminal. Although the embodiment contemplates the use of an audio signal from the computer system speaker to identify the onset of the remote access mode, that signal can just as likely be provided by a light emitting diode (LED) or other simple but visually perceivable device.

Operation of the embedded controller type computer system as refined in keeping with the present invention begins with enablement of power, as shown by oval 22, and concludes with a booting of the operating system, as noted earlier and identified by block 23. Upon the enablement of power 22, the initial stage of the power on self test mode of the embedded controller commences to initialize and configure hardware elements, as designated in block 24. If a keyboard is present, which is not contemplated as the norm for the embedded controller type computer system, initiation of the escape key as shown by operation 26 allows the user to initiate "normal" configuration/setup parameter entry 27 through the BIOS configuration/setup code operations 28. Upon the completion of "normal" configuration/setup parameter changes, the embedded controller recommences POST using the changed configuration/setup parameters.

According to the method defined by the present invention, the absence of escape entry 26 into a keyboard attached directly to the embedded controller, causes the embedded controller to generate a tone through its speaker, generally at 29, followed in direct succession by a determination in 31 whether a remote terminal is connected to the embedded controller. If the remote terminal is not connected to the embedded controller, the embedded controller initiates the concluding stages of POST at 25 and the boot of the operating system at 23. In contrast, if the remote terminal is found to be connected timer 32 is initiated with a periodic check at 33 for the presence of special control signals, such control signals likely including alpha numeric passwords as an aspect of limiting access into the configuration/setup change mode of operation. If the special sequence of control signals is not received from the remote terminal within the time specified at 34, operation of the embedded controller enters the concluding stage of POST at 25. In contrast, if the appropriate control signals are received from the remote terminal, the use of "new" interrupts 09h and 10h are specified at 36 for purposes of the ensuing configuration/setup communication. See FIG. 8 for the details of the operations performed within BIOS configuration/setup block 28, and FIG. 9 for the details of "new" interrupts 09h and 10h as specified in block 36.

Figure 6:
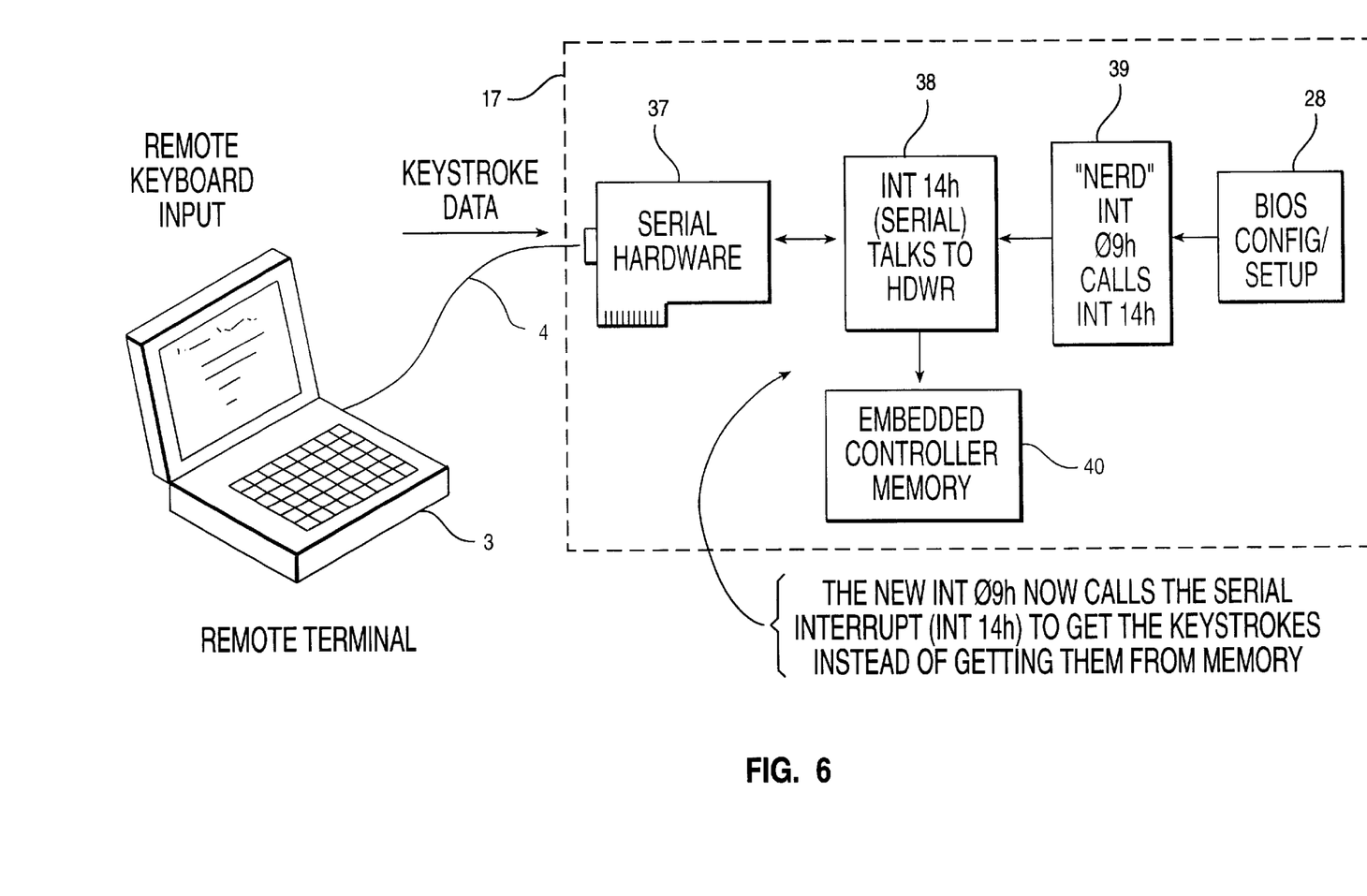
FIG. 6 is a schematic depicting the communication of configuration/setup data from tactile entry in a remote terminal to configuration/setup storage within the embedded controller.

FIG. 6 schematically depicts the operations associated with communicating keystroke data from remote terminal 3 to embedded controller 17. As preferably practiced, cable 4 provides data in serial format to serial port hardware 37, which then communicates through interrupt 14h to enter the configuration/setup parameters into embedded controller memory 40. Interrupt 14h at 38 is called by "new" interrupt 09h at 39 during the execution of BIOS configuration/setup code 28.

Figure 7:
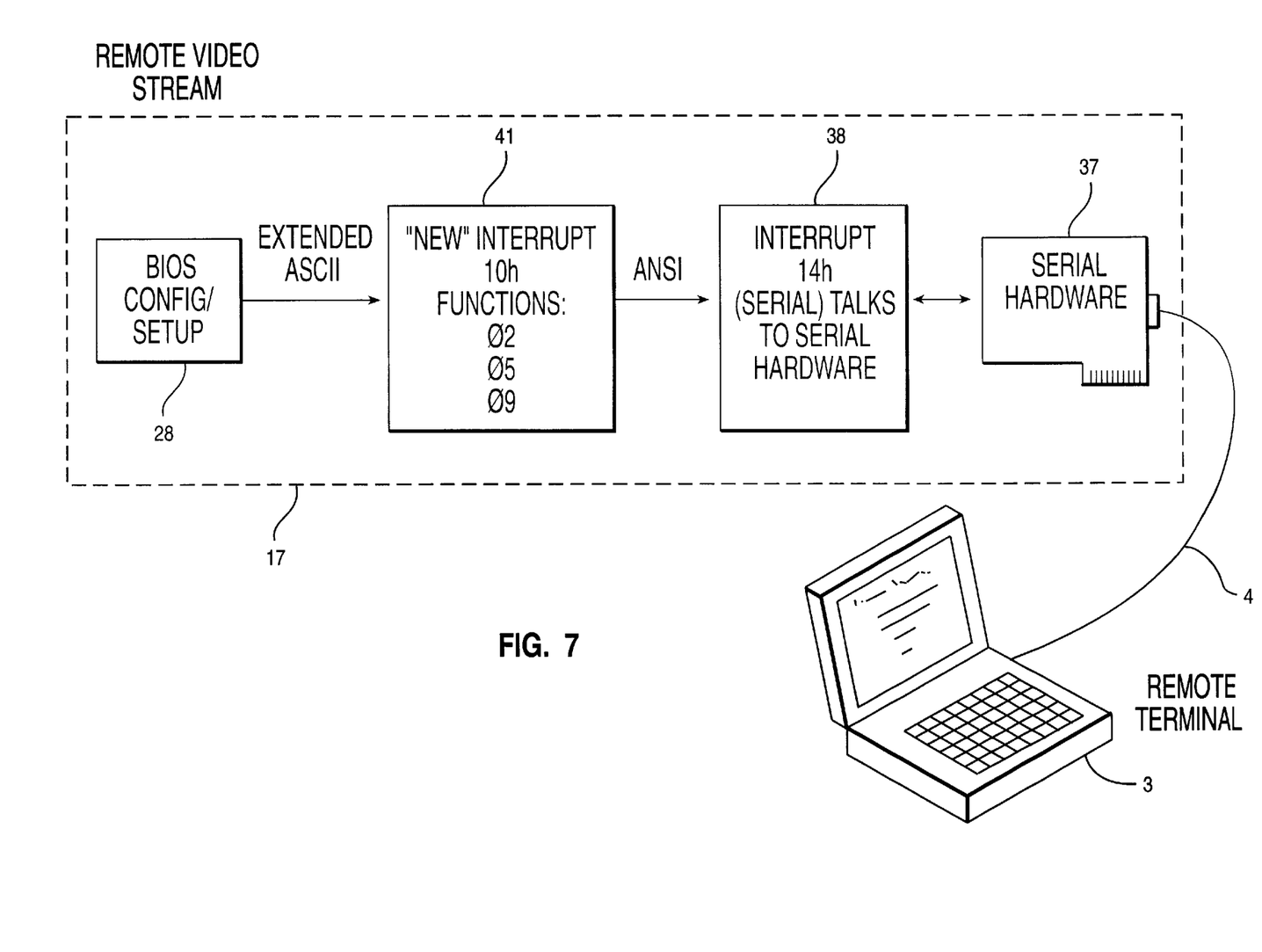
FIG. 7 is a schematic depicting communication of configuration/setup data between the embedded controller and the display of the remote terminal.

FIG. 7 schematically depicts the complementing communication of video information from embedded controller 17 to remote terminal 3, over cable 4, as an aspect of the bidirectional communication necessary to change the configuration/setup parameters in embedded controller 17. As shown, BIOS configuration/setup code 28 generates extended ASCII data which initiates "new" interrupt 10h at 41, particularized in FIG. 9 of the drawings, producing ANSI format data for interrupt 14h at reference numeral 38. Interrupt 14h initiates communication to transfer the data through serial port hardware 37.

Figure 8:
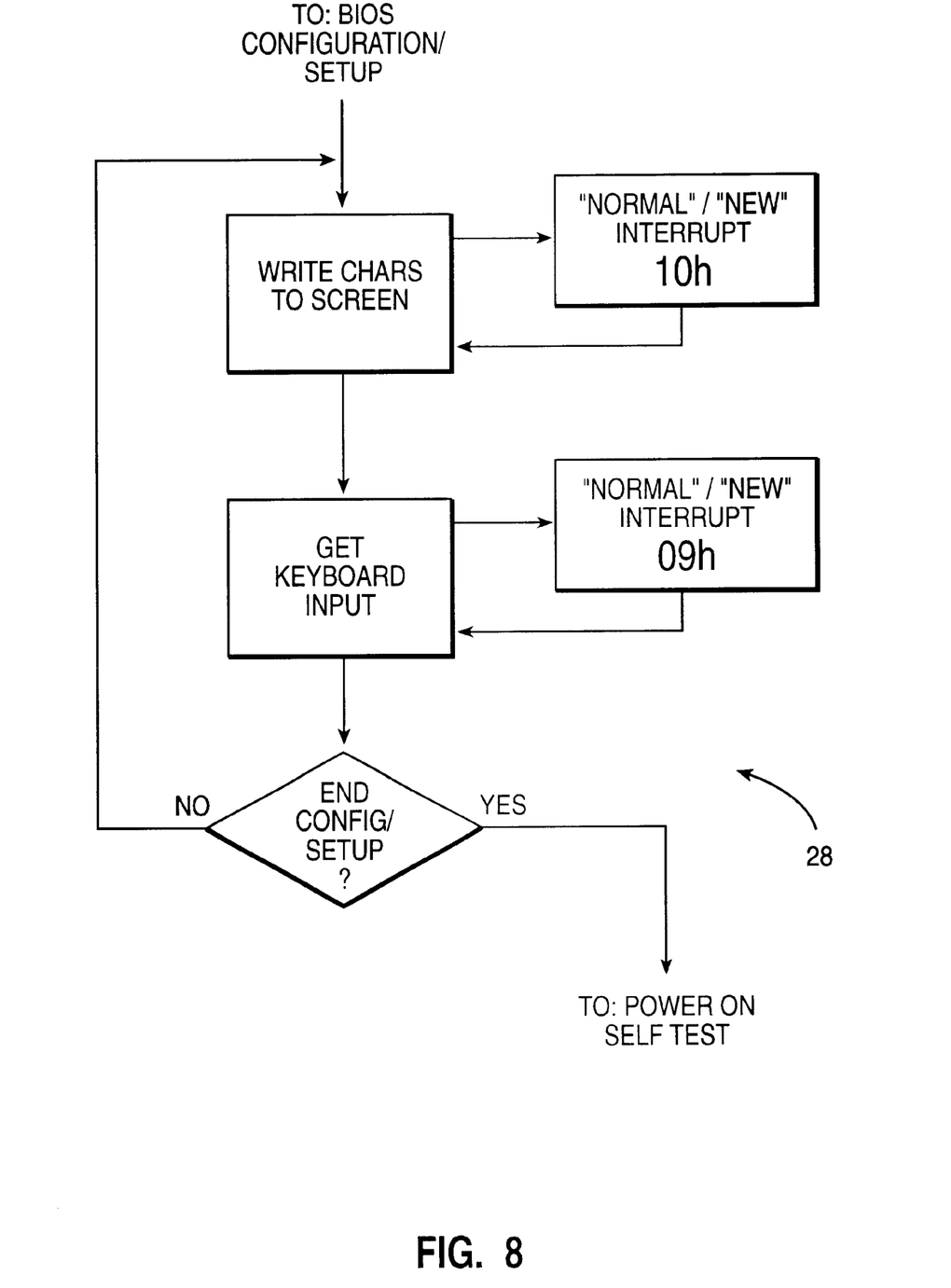
FIG. 8 is a schematic flow chart of the BIOS configuration/setup operations depicted by block 28 in FIG. 5.

The functions performed within BIOS configuration/setup block 28 of FIGS. 5, 6 and 7 are particularized in FIG. 8. The determination of whether the operations follow the path defined by "normal" interrupts 09h or 10h, or "new" interrupts 09h or 10h, is determined, as shown in FIG. 5, by the path through which BIOS configuration/setup block 28 is reached. If the path involves block 27, the interrupts are "normal". In contrast, if the path progresses through block 36, "new" interrupts 09h and 10h are utilized in the sequence of FIG. 8. "New" interrupt 09h calls serial interrupt 14h to acquire keystroke data from the serial input port rather than a memory location attributable to a keyboard locally connected to the embedded controller. As a consequence, as depicted in FIG. 6, the functional effect is to translate serially communicated configurations/setup data into data conventionally generated by a local keyboard.

Figure 9:
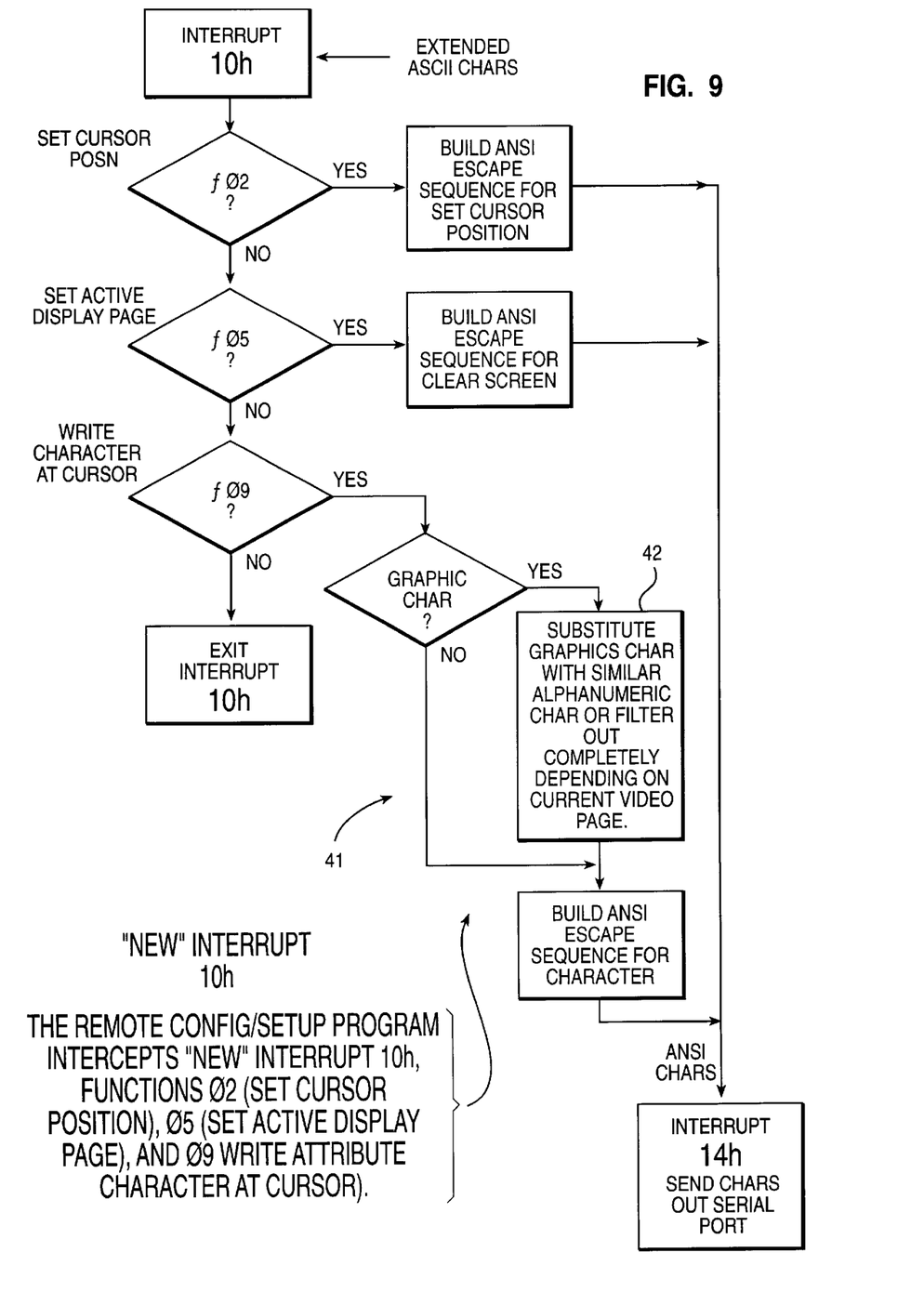
FIG. 9 is a schematic depicting by flow chart the operations associated with "new" interrupt 10h.
Figure 10:
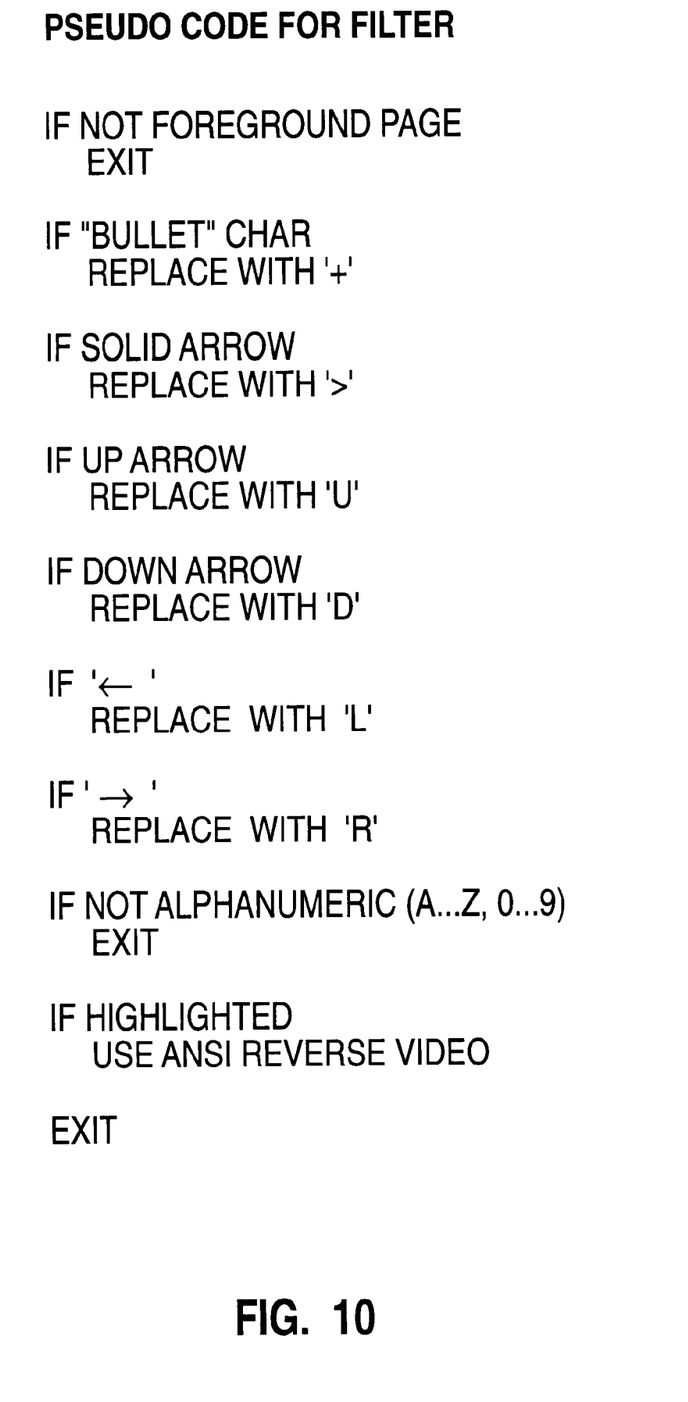
FIG. 10 sets forth pseudo code for filtering graphical images as generated within the embedded controller to generate alpha numeric data for communication to the remote terminal display.

"New" interrupt 10h is functionally depicted at 41 by the flow chart in FIG. 9. Note in the depiction of FIG. 9 that "new" interrupt 10h intercepts extended ASCII format data, sets the cursor position, sets the active display page, and provides attribute characters for the cursor. The output is ANSI format characters suitable for interrupt 14h transmission to the remote terminal. The conversion of extended ASCII characters to ANSI characters provided by "new" interrupt 10H includes the filtering of graphical characters as generally described in block 42 of FIG. 9. Pseudo code detailing the actual operations performed by the filter in block 42 appears in FIG. 10. The pseudo code is at a level of detail that one can readily derive appropriate source or object code for the filtering operation.

It will be understood by those skilled in the art that the embodiment set forth hereinbefore are merely exemplary of the numerous arrangements by which the invention may be practiced, and as such may be replaced by equivalents without departing from the invention which will now be defined by appended claims.

What is claimed is:

1. A method of remotely specifying configuration/setup parameters in a computer system not having a keyboard or a display, comprising the steps of:

initiating a power on test mode in the computer system;
   generating an audio-visual signal by the computer system;
   monitoring within the computer system for first control signals from a remote terminal generated in response to the audio-visual signal;
   communicating configuration/setup data between the computer system and the remote terminal if first control signals are detected during the monitoring;
   completing the power on test mode if first control signals are not detected within a specified time; and
   returning the computer system to an initiation of the power on test mode responsive to second control signals generated within the remote terminal following the communicating of configuration/setup data.

2. The method recited in claim 1, wherein the step of communicating comprises:

translating configuration/setup video signals in the computer system into data for transmission to the remote terminal;
   transmitting translated configurations/setup data from the computer system to the remote terminal;
   translating configuration/setup tactile entry signals in the remote terminal into data for transmission to the computer system;
   transmitting translated configuration/setup tactile entry data from the remote terminal to the computer system; and
   translating in the computer system translated configuration/setup tactile entry data received from the remote terminal into configuration/setup parameters.

3. The method recited in claim 1, wherein the monitoring step detects one or more selected alpha-numeric passwords.

4. The method recited in claim 2, wherein the step of translating configuration/setup video signals converts graphics signals into alpha-numeric characters of binary data.

5. The method recited in claim 2, wherein the monitoring step detects one or more selected alpha-numeric passwords.

6. The method recited in claim 3, wherein the audio-visual signal is a sound generated by a computer system speaker, and the tactile entry signals are generated by a keyboard.

7. The method recited in claim 4, wherein the monitoring step detects one or more selected alpha-numeric passwords.

8. The method recited in claim 5, wherein the audio-visual signal is a sound generated by a computer system speaker, and the tactile entry signals are generated by a keyboard.

9. The method recited in claim 7, wherein the audio-visual signal is a sound generated by a computer system speaker, and the tactile entry signals are generated by a keyboard.

10. A program product storable on a tangible media and operable to control a computer system not having a keyboard or a display, comprising:

means for initiating a power on test mode in the computer system;
    means for generating an audio-visual signal by the computer system;
    means for monitoring within the computer system for first control signals from a remote terminal generated in response to the audio-visual signal;
    means for communicating configuration/setup data between the computer system and the remote terminal if first control signals are detected during the monitoring;
    means for completing the power on test mode if first control signals are not detected within a specified time; and
    means for returning the computer system to an initiation of the power on test mode responsive to second control signals generated within the remote terminal following the communicating of configuration/setup data.

11. The program product recited in claim 10, wherein the means for communicating comprises:

means for translating configuration/setup video signals in the computer system into data for transmission to the remote terminal;

means for transmitting translated configurations/setup data from the computer system to the remote terminal;

means for translating configuration/setup tactile entry signals in the remote terminal into data for transmission to the computer system;

means for transmitting translated configuration/setup tactile entry data from the remote terminal to the computer system; and means for translating in the computer system translated configuration/setup tactile entry data received from the remote terminal into configuration/setup parameters.

12. The program product recited in claim 10, wherein the means for monitoring detects one or more selected alpha-numeric passwords.

13. The program product recited in claim 11, wherein the means for translating configuration/setup video signals converts graphics signals into alpha-numeric characters of binary data.

14. The program product recited in claim 11, wherein the means for monitoring detects one or more selected alpha-numeric passwords.

15. The program product recited in claim 12, wherein the audio-visual signal is a sound generated by a computer system speaker, and the tactile entry signals are generated by a keyboard.

16. The program product recited in claim 13, wherein the means for monitoring detects one or more selected alpha-numeric passwords.

17. The program product recited in claim 14, wherein the audio-visual signal is a sound generated by a computer system speaker, and the tactile entry signals are generated by a keyboard.

18. The program product recited in claim 6, wherein the audio-visual signal is a sound generated by a computer system speaker, and the tactile entry signals are generated by a keyboard.

* * * * *